(12) United States Patent
Zhang et al.

(10) Patent No.: US 12,050,632 B2
(45) Date of Patent: Jul. 30, 2024

(54) QUESTION ANSWERING APPARATUS AND METHOD

(71) Applicant: SEOUL NATIONAL UNIVERSITY R&DB FOUNDATION, Seoul (KR)

(72) Inventors: Byoung-Tak Zhang, Seoul (KR); Seongho Choi, Seoul (KR); Kyoung-Woon On, Seoul (KR); Yu-Jung Heo, Anyang-si (KR); You Won Jang, Seoul (KR); Ahjeong Seo, Sejong-si (KR); Seungchan Lee, Seoul (KR); Minsu Lee, Seongnam-si (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 609 days.

(21) Appl. No.: 17/270,514

(22) PCT Filed: Nov. 18, 2020

(86) PCT No.: PCT/KR2020/016229
§ 371 (c)(1),
(2) Date: Feb. 23, 2021

(87) PCT Pub. No.: WO2022/080567
PCT Pub. Date: Apr. 21, 2022

(65) Prior Publication Data
US 2022/0350826 A1    Nov. 3, 2022

(30) Foreign Application Priority Data

Oct. 12, 2020   (KR) .......................... 10-2020-0131339

(51) Int. Cl.
*G06F 16/783*  (2019.01)
*G06F 16/332*  (2019.01)
(Continued)

(52) U.S. Cl.
CPC ...... *G06F 16/3329* (2019.01); *G06F 16/7328* (2019.01); *G06F 16/783* (2019.01); *G06F 40/126* (2020.01); *G06V 30/414* (2022.01)

(58) Field of Classification Search
None
See application file for complete search history.

(56) References Cited

U.S. PATENT DOCUMENTS

| | | | |
|---|---|---|---|
| 2008/0155479 A1* | 6/2008 | Long ....................... | G06F 9/451 715/854 |
| 2020/0043174 A1 | 2/2020 | Togashi et al. | |

FOREIGN PATENT DOCUMENTS

| | | |
|---|---|---|
| JP | 2008-022292 A | 1/2008 |
| KR | 10-2020-0070142 A | 6/2020 |

OTHER PUBLICATIONS

Lei et al., "TVQA+: Spatio-Temporal Grounding for Video Question Answering", arXiv: 1904.11574v2, May 11, 2020, URL: https://arxiv.org/pdf/1904.11574.pdf (15 pages total).
(Continued)

*Primary Examiner* — Quynh H Nguyen
(74) *Attorney, Agent, or Firm* — Sughrue Mion, PLLC

(57) ABSTRACT

A question answering method that is performed by a question answering apparatus includes: receiving a data set including video content and question-answer pairs; generating input time-series sequences from the video content of the input data set and also generating a question-answer time-series sequence from the question-answer pair of the input data set; calculating weights by associating the input time-series sequence with the question-answer time-series sequence and also calculating first result values by performing operations on the calculated weights and the input time-series sequences; calculating second result values by paying attention to portions of the input time-series sequences that are directly related to characters appearing in
(Continued)

questions and answers; and calculating third result values by concatenating the time-series sequences, the first result values, the second result values, and Boolean flags and selecting a final answer based on the third result values.

8 Claims, 5 Drawing Sheets

(51) Int. Cl.
*G06F 16/732* (2019.01)
*G06F 40/126* (2020.01)
*G06V 30/414* (2022.01)

(56) References Cited

OTHER PUBLICATIONS

Chen et al., "TVT: Two-View Transformer Network for Video Captioning", Proceedings of The 10th Asian Conference on Machine Learning (ACML), PMLR 95, ACML 2018, pp. 847-862, 2018, URL: http://proceedings.mlr.press/v95/chen18b/chen18b.pdf (16 pages total).

\* cited by examiner

Script — 301

Haeyoung1: I(Haeyoung1)'m not getting married.
Deogi: What did you(Haeyoung1) say?

Behavior, Emotion — 303

(Deogi, stand up, Surprise)
(Haeyoung1, sit down, Sadness)
(Deogi, stand up, Anger)

Bounding box — 305

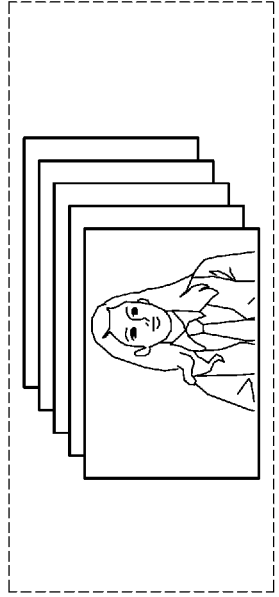

QA — 307

Q: How did Deogi react when Haeyoung1 said Haeyoung1 won't get married?
① Deogi yelled at Haeyoung1 and hit Haeyoung1's head.
② Deogi praised Haeyoung1 and made food.
③ Deogi cried and got out of the house.
④ Deogi fell on the floor.
⑤ Deogi threw the knife to Haeyoung1.

QUESTION ANSWERING APPARATUS AND METHOD

CROSS REFERENCE TO RELATED APPLICATIONS

This application is a National Stage of International Application No. PCT/KR2020/016229 filed Nov. 18, 2020, claiming priority based on Korean Patent Application No. 10-2020-0131339 filed Oct. 12, 2020.

TECHNICAL FIELD

The embodiments disclosed herein relate to hierarchical video story modeling and a question answering apparatus and method that answer questions about a video using the hierarchical video story modeling.

The present study was conducted as a result of research into the Innovation Growth Engine Project sponsored by the Korean Ministry of Science and ICT and the Institute of Information & Communications Technology Planning & Evaluation (IITP-2017-0-01772-004).

The present study was conducted as a result of research into the SW Computing Industry Fundamental Technology Development Project sponsored by the Korean Ministry of Science and ICT and the Institute of Information & Communications Technology Planning & Evaluation (IITP-2015-0-00310-006).

The present study was conducted as a result of research into the Innovation Growth Engine Project sponsored by the Korean Ministry of Science and ICT and the Institute of Information & Communications Technology Planning & Evaluation (IITP-2019-0-01367-002).

BACKGROUND ART

Recently, the field of video story modeling is emerging as a highly challenging field that merges visual research and natural language processing research. Visual Question Answering (VQA) technology is a representative technology that deals with an area in which visual processing and natural language processing are merged together. The VQA technology analyzes data contained in a video and also infers answers to questions accordingly so that it can answer questions about meanings or a plot contained in the video.

However, the video story-related question answering problem is evaluated as a difficult field to solve due to the increase in difficulty resulting from the characteristics of a video itself, which contains a lot of information unlike a simple image, and also resulting from the various types of questions attributable to the above characteristics.

Accordingly, it is difficult to collect a data set, and also a conventional video story question-answer data set has several limitations.

Furthermore, since conventional video question-answer models use only subtitle and image frame information, a problem arises in that it is difficult to use information about an utterer or emotion contained in the voice of a character that is not inferred from the subtitle or the image.

In connection with this, Korean Patent Application Publication No. 2017-0043582, which is a prior art document, discloses 'Multilingual Image Question Answering.' In this prior art document, there is described an image question answering method capable of answering a multilingual question in multiple languages. However, this prior art is directed to a learning model that is trained to be able to answer questions based on a partially captioned image data set, and does not provide a suggestion about the problems or improvement of the question answering technology based on a video consisting of multiple image frames, subtitles and audio.

Therefore, there is a need for a method capable of mitigating the difficulty of video question answering and also distinguishing utterers or emotions and then inferring appropriate answers to questions.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

DISCLOSURE

Technical Problem

The embodiments disclosed herein are intended to provide a question answering method for effectively solving question answering related to a video story by performing character-centered modeling on the story contained in a video and a question answering apparatus for performing the question answering method.

Technical Solution

In order to overcome the above technical problem, there is provided a method including: receiving a data set including video content and question-answer pairs; generating input time-series sequences from the video content of the input data set and also generating a question-answer time-series sequence from the question-answer pair of the input data set; calculating weights by associating the input time-series sequence with the question-answer time-series sequence and also calculating first result values by performing operations on the calculated weights and the input time-series sequences; calculating second result values by paying attention to portions of the input time-series sequences that are directly related to characters appearing in questions and answers; and calculating third result values by concatenating the time-series sequences, the first result values, the second result values, and Boolean flags and selecting a final answer based on the third result values.

Advantageous Effects

According to any one of the technical solutions, the question answering apparatus may perform a comprehensive understanding of a video story through an evaluation method having hierarchical difficulties and a data set having character-centered video annotations.

Furthermore, the question answering apparatus may learn character-centered expressions effectively through a dual matching multi-stream model that infers correct answers based on character-centered story understanding by utilizing a context matching module and a character matching module.

The effects that can be obtained by the embodiments disclosed herein are not limited to the above-described effects, and other effects that have not been described above will be apparently understood by those having ordinary skill in the art, to which the present invention pertains, from the following description.

DESCRIPTION OF DRAWINGS

FIG. 3 is a view showing an example of a data set used in a question answering apparatus according to an embodiment.

BEST MODE

Figure 1:
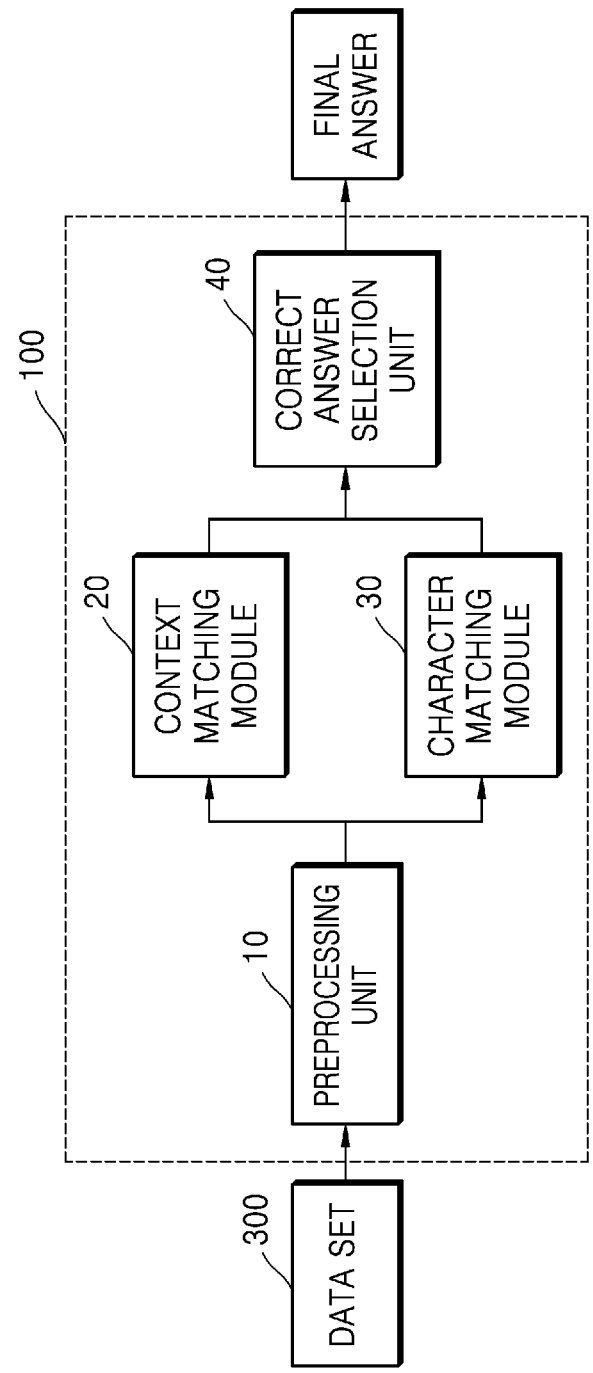
FIG. 1 is a diagram showing a dual matching multi-stream model configured to calculate an optimum answer to a question about a video according to an embodiment and the flow of data in the dual matching multi-stream model.

As a technical solution for solving the above-described technical problem, according to an embodiment, there is provided a question answering method that is performed by a question answering apparatus, the question answering method including: a step of receiving a data set including video content and question-answer pairs; a preprocessing step of generating input time-series sequences from the video content of the input data set and also generating a question-answer time-series sequence from the question-answer pair of the input data set; a step of calculating weights by associating the input time-series sequence with the question-answer time-series sequence and also calculating first result values by performing operations on the calculated weights and the input time-series sequences; a step of calculating second result values by paying attention to portions of the input time-series sequences that are directly related to characters appearing in questions and answers; and a step of calculating third result values by concatenating the time-series sequences, the first result values, the second result values, and Boolean flags and selecting a final answer based on the third result values.

According to another embodiment, there is provided a question answering apparatus including: a storage unit configured to store a program that performs question answering; and a control unit including at least one processor; wherein when a data set including video content and question-answer pairs is received by executing the program, the control unit: generates input time-series sequences from the video content of the input data set, and also generates a question-answer time-series sequence from the question-answer pair of the input data set; calculates weights by associating the input time-series sequence with the question-answer time-series sequence, and also calculates first result values by performing operations on the calculated weights and the input time-series sequences; calculates second result values by paying attention to portions of the input time-series sequences that are directly related to characters appearing in questions and answers; and calculates third result values by concatenating the time-series sequences, the first result values, the second result values, and Boolean flags, and selects a final answer based on the third result values.

According to another embodiment, there is provided a computer-readable storage medium having stored thereon a program for performing a question answering method that is performed by a question answering apparatus, wherein the question answering method includes: a step of receiving a data set including video content and question-answer pairs; a preprocessing step of generating input time-series sequences from the video content of the input data set and also generating a question-answer time-series sequence from the question-answer pair of the input data set; a step of calculating weights by associating the input time-series sequence with the question-answer time-series sequence and also calculating first result values by performing operations on the calculated weights and the input time-series sequences; a step of calculating second result values by paying attention to portions of the input time-series sequences that are directly related to characters appearing in questions and answers; and a step of calculating third result values by concatenating the time-series sequences, the first result values, the second result values, and Boolean flags and selecting a final answer based on the third result values.

According to another embodiment, there is provided a computer program that is executed by a question answering apparatus and stored in a computer-readable medium to perform a question answering method that is performed by the question answering apparatus, wherein the question answering method includes: a step of receiving a data set including video content and question-answer pairs; a preprocessing step of generating input time-series sequences from the video content of the input data set and also generating a question-answer time-series sequence from the question-answer pair of the input data set; a step of calculating weights by associating the input time-series sequence with the question-answer time-series sequence and also calculating first result values by performing operations on the calculated weights and the input time-series sequences; a step of calculating second result values by paying attention to portions of the input time-series sequences that are directly related to characters appearing in questions and answers; and a step of calculating third result values by concatenating the time-series sequences, the first result values, the second result values, and Boolean flags and selecting a final answer based on the third result values.

MODE FOR INVENTION

Various embodiments will be described in detail below with reference to the accompanying drawings. The following embodiments may be modified to and practiced in various different forms. In order to more clearly illustrate the features of the embodiments, detailed descriptions of items that are well known to those having ordinary skill in the art to the following embodiments pertain will be omitted. In the drawings, portions unrelated to the following description will be omitted. Throughout the specification, like reference symbols will be assigned to like portions.

Throughout the specification, when one component is described as being "connected" to another component, this includes not only a case where they are 'directly connected' to each other but also a case where they are 'connected to each other with a third component disposed therebetween.' Furthermore, when a component is described as 'including' another component, this does not mean that the former component excludes another component but means that the former component may further include another component, unless explicitly described to the contrary.

Furthermore, the terms "unit" or "module" described herein refers to a unit within which at least one function or operation is processed, which may be implemented by hardware or software or a combination of hardware and software.

Figure 2:
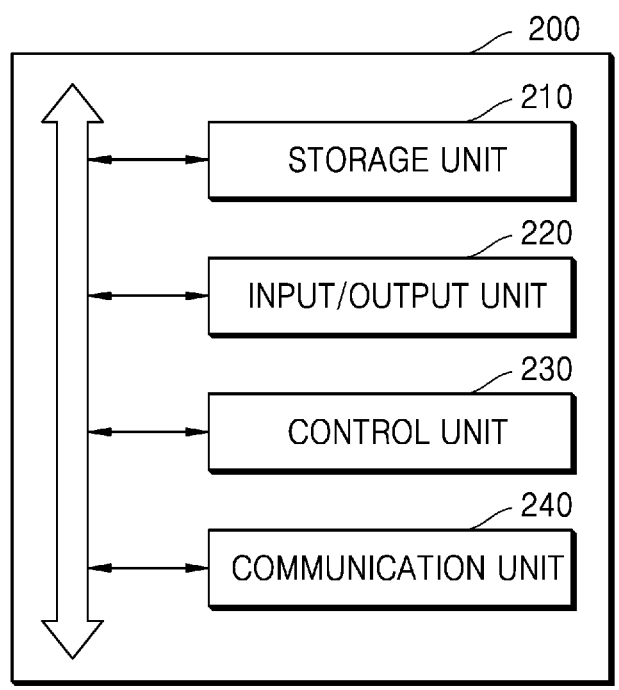
FIG. 2 is a diagram showing the configuration of an apparatus for calculating an optimum answer to a question about a video according to an embodiment.

FIG. 1 is a diagram showing a dual matching multi-stream model 100 configured to calculate an optimum answer to a question about a video according to an embodiment and the flow of data in the dual matching multi-stream model 100, and FIG. 2 is a diagram showing the configuration of an apparatus for calculating an optimum answer to a question about a video according to an embodiment.

The components of the apparatus shown in FIG. 2 will be described first, and then a method in which the apparatus of FIG. 2 constructs the dual matching multi-stream model 100 of FIG. 1 and calculates an optimal answer to a question about a video using the dual matching multi-stream model 100 will be described.

Referring to FIG. 2, a question answering apparatus 200 according to an embodiment may include a storage unit 210, an input/output unit 220, a control unit 230, and a communication unit 240.

The storage unit 210 may store various types of data or programs required for question answering. The storage unit 210 may store a data set required for the process of learning question answering for a video.

Furthermore, the storage unit 210 may at least temporarily hold or update a program configured to learn question answering for a video and answer questions accordingly and data related to models or a neural network used for learning and question answering.

Meanwhile, the input/output unit 220 is a component that receives data or user commands, calculates data according to a user's input, and outputs the results of processing. According to an embodiment, the input/output unit 220 may include a user input means such as a keyboard, a mouse, or a touch panel, and an output means such as a monitor, or a speaker.

Furthermore, the control unit 230 includes at least one processor such as a CPU, and may control the overall operation and configuration of the question answering apparatus 200. In particular, the control unit 230 may execute a program stored in the storage unit 210 or read data, perform video story modeling, and select an appropriate answer to a question accordingly.

In particular, the control unit 230 models a video story by analyzing the image frames, script and emotional and behavioral data of a video. A detailed process in which the controller 230 models a video story and answers a question accordingly will be described in greater detail later.

Meanwhile, the communication unit 240 is a component that allows the question answering apparatus 200 to exchange data with another apparatus. The communication unit 240 may receive a video data set to be analyzed by the control unit 230, or may receive and provide data related to a neural network required in a process in which the control unit 230 analyzes a video data set or models a video story using the video data set. Furthermore, the communication unit 240 may communicate with another terminal, and thus the communication unit 240 may transmit a question, received from the other terminal, to the control unit 230 or the control unit 230 may provide an answer, selected through the calculation of the control unit 230, to the other terminal.

A question answering process performed by the question answering apparatus 200 will be described in detail below. Meanwhile, prior to the following description, a data set used for the dual matching multi-stream model 100 will be described first. FIG. 3 is a view showing an example of a data set used in a question answering apparatus according to an embodiment.

First, as shown in FIG. 3, a video data set 300 may include question-answer pair data 307 and three types of video content data 301, 303 and 305 coming from a video. In this case, the three types of video content data include script data 301 in which utterers are indicated, visual metadata 303 related to behaviors and emotions, and bounding box data 305.

Question data and data on a plurality of choices for each question may be included in the question-answer pair data 307. The script data 301 in which utterers are indicated provides information about a person designated by a pronoun in the dialogue of the video when the person corresponds to a main character. The visual metadata 303 includes the behaviors and emotions of main characters, and annotations representing the behaviors and emotions of characters are present in all frames present in the video. The types of behaviors and emotions may be defined in advance. Each of the bounding boxes 305 includes the face part or full-body part of a character, and may be used to identify a character through image analysis. There are two types of bounding boxes 305 including a face part and a full-body part, respectively.

A process in which the control unit 230 calculates an optimal answer to a question about a video will be described below with reference to FIG. 1.

Referring to FIG. 1, it can be seen that the dual matching multi-stream model 100 includes a preprocessing unit 10, a context matching module 20, a character matching module 30, and a correct answer selection unit 40.

The control unit 230 implements the dual matching multi-stream model 100 by executing a program stored in the storage unit 210, and calculates an optimal answer to a question about a video through the dual matching multi-stream model 100.

1. Preprocessing Step

When the preprocessing unit 10 receives the data set 300, it generates input time-series sequences and a question-answer time series sequence through a preprocessing process. A detailed process is as follows.

When the preprocessing unit 10 receives the data set, it generates time-series data by concatenating data included in the data set in sequence. According to an embodiment, the data set may include five-choice question-answer pairs and three types of video data (a script in which utterers are indicated, visual metadata (behaviors and emotions), and bounding boxes) coming from a video.

The preprocessing unit 10 forms time-series data by concatenating all the words of a script, all the behaviors and emotions of video frames, the character bounding boxes of the video frames, and the questions and choices of question-answer pairs in sequence. In this case, time-series data related to the script, the visual metadata (behaviors and emotions), and the bounding boxes coming from the video is defined as input time-series data, and time-series data related to the questions and choices of the question-answer pairs is defined as question-answer time-series data.

The preprocessing unit 10 generates a feature vector including a related character by extracting a word vector and an image feature vector from the time-series data and concatenating the extracted vectors with the related character information of the time-series data as a one-hot vector. In this case, the related character refers to an utterer of the script, the target character of a behavior and an emotion, or the target character of a bounding box. According to an embodiment, for all the pieces of time-series data, the preprocessing unit 10 extracts a word vector via a pre-trained Glove model for words and also extracts an image feature vector via a pre-trained ResNet-18 model for images. A feature vector including a related character is generated by concatenating the extracted word vector or image feature vector with information about a related character of the time-series data as a one-hot vector.

The preprocessing unit 10 generates a time-series sequence having a contextual flow by inputting the feature vector including a related character to a bidirectional Long/Short Term Memory (bi-LSTM) model. In this case, the script S may be represented by $H^S \in R^{T_S \times 2h}$, the visual metadata M for the behaviors and the emotions may be represented by $H^M \in R^{T_M \times 2h}$, and the bounding boxes B may be represented by $H^B \in R^{T_B \times 2h}$. In the same manner, the question may be represented by $H^Q$, and each of the choices may be represented by $H^{A_i}$. In this case, T is the length of each piece of time-series data, and h is the number of dimensions of the hidden vector of the bi-LSTM. In this case, time-series sequences related to the script, the visual metadata (behaviors and emotions), and the visual bounding boxes coming from the video are defined as input time-series sequences, and a time-series sequence related to the questions and choices of the question-answer pairs is defined as a question-answer time-series sequence.

2. Context Matching Module

The context matching module 20 calculates weights by associating the input time-series sequences with the question-answer sequence, and calculates first result values by performing operations on the calculated weights and the input time-series sequences.

According to an embodiment, the context matching module 20 calculates first result values $C^{S,Q}$, $C^{S,A_i}$, $C^{M,Q}$, $C^{M,A_i}$, $C^{B,Q}$ and $C^{B,A_i}$ by converting the input time-series sequences into forms associated with the question-answer sequence.

The first result values of the script time-series sequence of the input time-series sequences are calculated by Equations 1 and 2 below:

$$C^{S,Q} = (H^S(H^Q)^T)H^Q \in R^{T_S \times 2h} \tag{1}$$

$$C^{S,A_i} = (H^S(H^{A_i})^T)H^{A_i} \in R^{T_S \times 2h} \tag{2}$$

In the same manner, $C^{M,Q}$, $C^{M,A_i}$, $C^{B,Q}$ and $C^{B,A_i}$ may be calculated.

3. Character Matching Module

The character matching module 30 calculates second result values by paying attention to portions of the input time-series sequences that are directly related with characters appearing in the questions and answers.

According to an embodiment, the character matching module 30 calculates second result values $C^{S,q_i}$, $C^{M,q_i}$ and $C^{B,q_i}$ by paying attention to portions of the input time-series sequences that are directly related with characters appearing in the questions and answers.

More specifically, the character matching module 30 calculates second result values by using dot-product attention and multi-head attention.

First, the character matching module 30 represents a character appearing in the question-answer pair $\{Q,A_i\}$ as a multi-hot vector $c_i$, and calculates a character query $q_i = c_i^T M_c$ which is a product of $c_i$ and a matrix $M_c$ representing the features of each character. The character query $q_i = c_i^T M_c$ is equal to the sum of the feature values of the character appearing in the question-answer pair. A dot-product attention score is calculated using the character query and Equations 3 and 4 below:

$$\text{DotProd}(x,Y) = \text{softmax}(xY^T/\sqrt{d_k}) \tag{3}$$

$$\alpha_i = \text{DotProd}(qW_i^q, KW_i^K) \in R^T \tag{4}$$

In this case, q is a character query $q_i$, and K are individual input time-series sequences $H^S$, $H^M$ and $H^B$. $qW_i^q$ and $KW_i^K$ are calculated by projecting the character query and each of the input time series sequences onto the hidden vector h having the number of dimensions $d_k$. Thereafter, the dot-product attention score is calculated using $qW_i^q$ and $KW_i^K$.

In this case, $\alpha_i$ is an i-th projection dot-product attention score for each input time-series sequence, and $W_i^q$ and $W_i^K$ are i-th weight matrices.

After the above-described dot-product attention has been performed, an i-th head is calculated by expanding the dot-product attention score and then multiplying the expanded dot-product attention score by each projection vector in order to perform the multi-head attention. This may be represented by Equation 5 below:

$$\text{head}_i = (\alpha_i \times 1^T) \odot (KW_i^V) \tag{5}$$

In this case, matrix 1 means that all elements are 1 and the number of dimensions is $d_k$, X means a vector cross-product operation, $\odot$ means an operation performing element-wise multiplication between matrices, and $W_i^V$ is an i-th projection matrix.

In two dimensions, all heads are concatenated and projection is performed to have the same dimensions as the input time-series sequences. This may be represented by Equation 6 below:

$$\text{MultiHeadAttn}(H,q_i) = [\text{head}_i; \ldots ; \text{head}_h]W_0 \tag{6}$$

In this case, $W_0$ is a linear layer, and is represented by $W_0 \in R^{hd_k \times d}$.

The results of the multi-head attention have the same dimensions as the input time-series sequences, and thus input and output may be summed. The sum is normalized to calculate third result values. This may be represented by Equation 7 below:

$$C = \text{Norm}(H + \text{MultiHeadAttn}(H,q_i)) \tag{7}$$

In this case, third result values corresponding to the cases where H is $H^S$ (the script), $H^M$ (the visual metadata (behaviors and emotions)), or $H^B$ (the bounding boxes) are $C^{S,q_i}$, $C^{M,q_i}$ and $C^{B,q_i}$, respectively. The second result values are values representing the contextual flow of a story that is directly related to characters in the question-answer pairs.

4. Correct Answer Selection Step

The correct answer selection unit 40 calculates third result values by concatenating the input time-series sequences, the first result values, the second result values, and Boolean flags for each piece of video data, and selects a final answer based on the calculated third result values. In this case, the Boolean flag f is defined as indicating a true value (True) when the target character or utterer of the visual metadata appears in the question-answer pairs. According to an embodiment, in the case of script data, the correct answer selection unit 40 calculates a third result value $H^{S_{alt},Q,A_i}$ for the script data by concatenating all of $H^S$ as a result of the preprocessing module, $C^{S,Q}$ and $C^{S,A_i}$ as results of the context module, and $C^{S,q_i}$ as a result of the character matching module. This may be represented by Equation 8 below:

$$H^{S_{alt},Q,A_i} = [H^S; C^{S,Q}; C^{S,A_i}; C^{S,q_i}; f] \tag{8}$$

In the same manner, a third result value $H^{M_{alt},Q,A_i}$ for the visual metadata (the behaviors and emotions) and a third result value $H^{B_{alt},Q,A_i}$ for the bounding boxes may be obtained.

Accordingly, the third result values according to an embodiment may be $H^{S_{alt},Q,A_i}$, $H^{M_{alt},Q,A_i}$ and $H^{B_{alt},Q,A_i}$.

The correct answer selection unit 40 selects a final answer based on the third result values. According to an embodiment, the correct answer selection unit 40 performs Max-pooling by applying multiple 1-D convolution filters having different kernel sizes to the third result values $H^{S_{alt},Q,A_i}$, $H^{M_{alt},Q,A_i}$ and $H^{B_{alt},Q,A_i}$, obtains values $o^S$, $o^M$ and $o^B$ for each $A_i$ using the above results as a linear layer, adds all result values, and selects a correct answer candidate having the highest value as the final correct answer.

Figure 4:
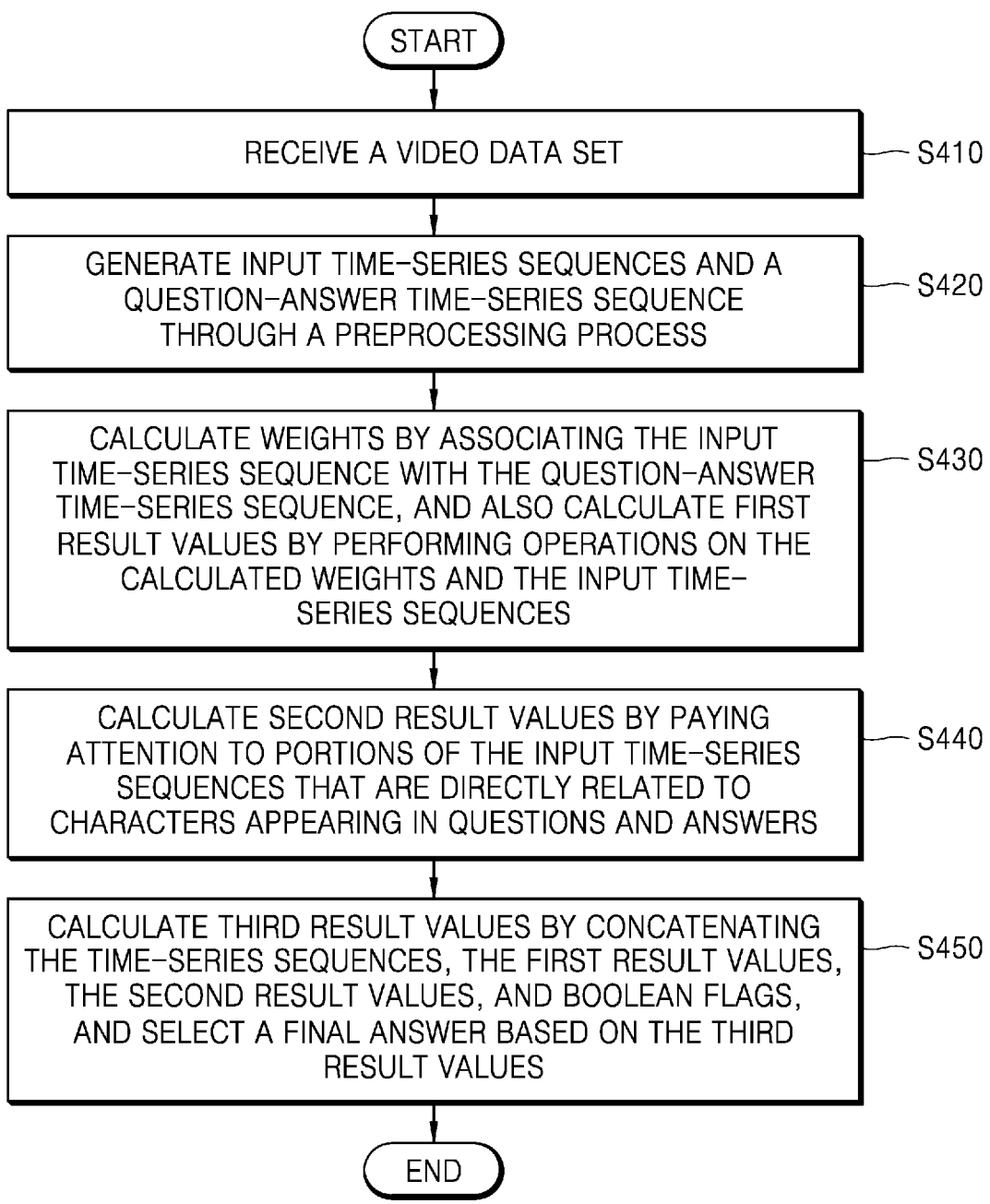
FIGS. 4 and 5 are diagrams showing a question answering method that is performed by a question answering apparatus according to an embodiment in a stepwise manner.
Figure 5:
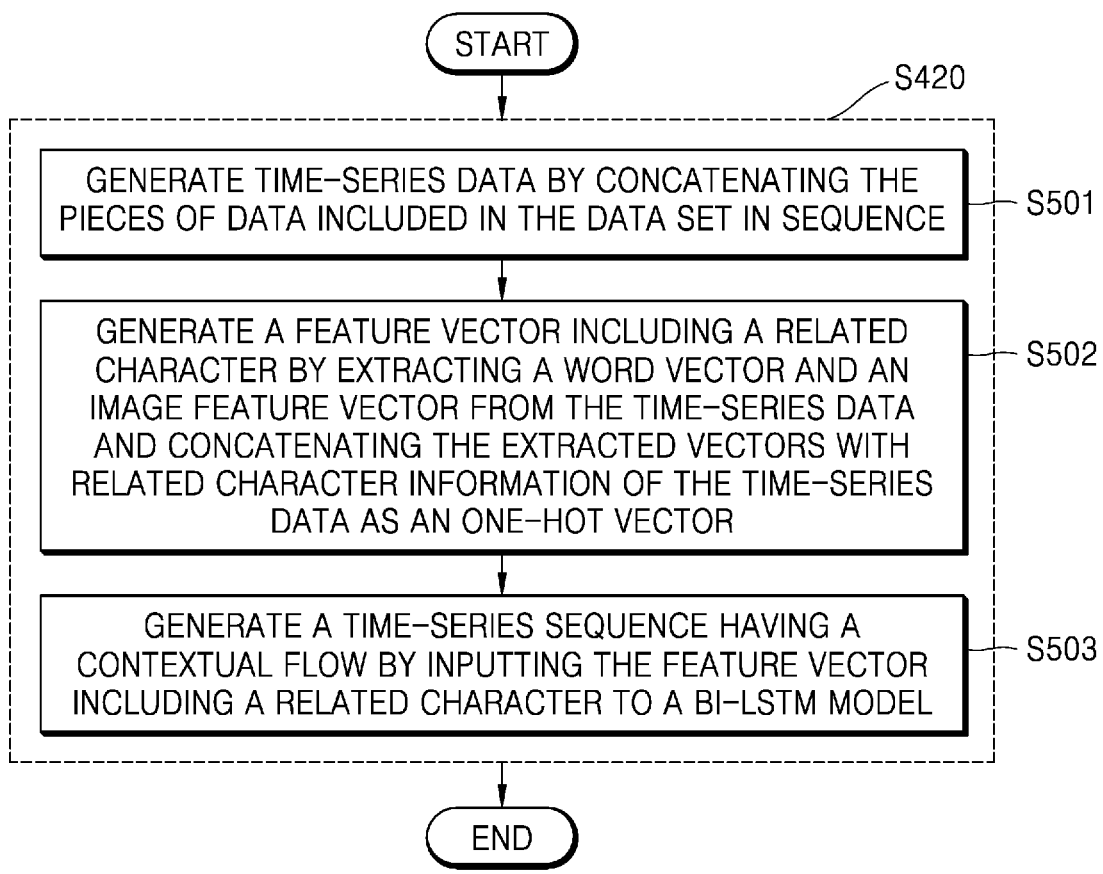

FIGS. 4 and 5 are diagrams showing a question answering method that is performed by a question answering apparatus according to an embodiment in a stepwise manner.

As shown in the drawings, the question answering apparatus 200 receives a video data set used to perform video story modeling at step S410.

In this case, the data set may include question-answer pairs and three types of time-series data coming from a video. In this case, the three types of time-series data includes script data in which utterers are indicated, visual metadata (behaviors and emotions), and visual bounding box data.

The question answering apparatus 200 generates input time-series sequences and a question-answer time-series sequence through a preprocessing process at step S420. Step S420 of performing the preprocessing process may be subdivided into steps S501 to S503.

Step S420 will be described in detail with reference to FIG. 5.

The question answering apparatus 200 generates time-series data obtained by concatenating the pieces of data included in the data set in sequence at step S501. According to an embodiment, the data set may include five-choice question-answer pairs, and three types of time-series data (a script in which utterers are indicated, visual metadata (behaviors and emotions), and bounding boxes) coming from the video. The question answering apparatus 200 forms time-series data by concatenating all the words of the script, all the behaviors and emotions of video frames, the character bounding boxes of the video frames, and the questions and choices of question-answer pairs in sequence. In this case, time-series data related to the script, the visual metadata (behaviors and emotions), and the bounding boxes coming from the video is defined as input time-series data, and time-series data related to the questions and choices of the question-answer pairs is defined as question-answer time-series data.

The question answering apparatus 200 generates a feature vector including a related character by extracting a word vector and an image feature vector from the time-series data and concatenating the extracted vectors with information about the related character at each time point of the time-series data as a one-hot vector at step S502. According to an embodiment, the question answering apparatus 10 extracts a word vector via a pre-trained Glove model for words and also extracts an image feature vector via a pre-trained ResNet-18 model for images, with respect to all the pieces of time-series data. The question answering apparatus 200 converts the related character of the input time-series data and the questions and answers time-series data into a one-hot vector and concatenates the extracted vectors with the one-hot vector at each time point. In this case, the related character refers to an utterer of the script, the target character of a behavior and an emotion, or the target character of a bounding box.

The question answering apparatus 200 generates a time-series sequence having a contextual flow by inputting the feature vector including a related character to a bidirectional Long/Short Term Memory (bi-LSTM) model at step S503. In this case, the script S may be represented by $H^S \in R^{T_S \times 2}h$, the visual metadata M for the behaviors and the emotions may be represented by $H^M \in R^{T_M \times 2}h$ and the bounding boxes B may be represented by $H^B \in R^{T_B \times 2}h$. In the same manner, the question may be represented by $H^Q$, and each of the choices may be represented by $H^{A_i}$. In this case, T is the length of each piece of time-series data, and h is the number of dimensions of the hidden vector of the bi-LSTM.

The question answering apparatus 200 calculates weights by associating the input time-series sequences with the question-answer sequence, and calculates first result values by performing operations on the calculated weights and the input time-series sequences at step S430. Step S430 corresponds to the step called the context matching module. First result values C and $C^{S,Q}$, $C^{S,A_i}$, $C^{M,A_i}$, $C^{B,Q}$ and $C^{B,A_i}$ are calculated by converting the input time-series sequences into forms associated with the question-answer sequence using Equations 1 and 2 above.

The question answering apparatus 200 calculates second result values by paying attention to portions of the input time-series sequences that are directly related with characters appearing in the questions and answers at step S440. Step S440 corresponds to the step called the character matching module. Second result values $C^{S,q_i}$, $C^{M,q_i}$ and $C^{B,q_i}$ are calculated by paying attention to portions of the input time-series sequences that are directly related with characters appearing in the questions and the answers using Equations 3 to 7 above.

The question answering apparatus 200 calculates third result values by concatenating the input time-series sequences, the first result values, the second result values, and Boolean flags at step S450. Third result values $H^{S_{alb},Q,A_i}$, $H^{M_{alb},Q,A_i}$, and $H^{B_{alb},Q,A_i}$ are calculated by concatenating all of $H^S$ as a result of the preprocessing module, $C^{S,Q}$ and $C^{S,A_i}$ as results of the context module, and $C^{S,q_i}$ as a result of the character matching module, as represented by Equation 8 above.

The question answering apparatus 200 selects a final answer based on the third result values at S460. According to an embodiment, the question answering apparatus 10 performs Max-pooling by applying multiple 1-D convolution filters having different kernel sizes to the third result values $H^{S_{alb},Q,A_i}$, $H^{M_{alb},Q,A_i}$ and $H^{B_{alb},Q,A_i}$, obtains values $o^S$, $o^M$ and $o^B$ for each $A_i$ using the above results as a linear layer, adds all result values, and selects a correct answer candidate having the highest value as the final correct answer.

The term 'unit' used in the above-described embodiments means software or a hardware component such as a field-programmable gate array (FPGA) or application-specific integrated circuit (ASIC), and a 'unit' performs a specific role. However, a 'unit' is not limited to software or hardware. A 'unit' may be configured to be present in an addressable storage medium, and also may be configured to run one or more processors. Accordingly, as an example, a 'unit' includes components, such as software components, object-oriented software components, class components and task components, processes, functions, attributes, procedures, subroutines, segments in program code, drivers, firmware, microcode, circuits, data, a database, data structures, tables, arrays, and variables.

Each of the functions provided in components and 'unit(s)' may be coupled to a smaller number of components and 'unit(s)' or divided into a larger number of components and 'unit(s).'

In addition, components and 'unit(s)' may be implemented to run one or more CPUs in a device or secure multimedia card.

Each of the question answering methods according to the embodiments described with reference to FIGS. 3 to 5 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, each of the question answering methods according to the embodiments described with reference to FIGS. 3 to 5 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, each of the question answering methods according to the embodiments described with reference to FIGS. 3 to 5 may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued via the present specification should be defined by the attached claims, rather than the detailed description. All modifications and variations which can be derived from the meanings, scopes and equivalents of the claims should be construed as falling within the scope of the present invention.

The invention claimed is:

1. A question answering method that is performed by a question answering apparatus, the question answering method comprising:
    a step of receiving a data set including video content and question-answer pairs based on a user input;
    a preprocessing step of generating input time-series sequences from the video content of the input data set and also generating a question-answer time-series sequence from the question-answer pair of the input data set;
    a step of calculating weights by associating the input time-series sequence with the question-answer time-series sequence and also calculating first result values by performing operations on the calculated weights and the input time-series sequences;
    a step of calculating second result values by paying attention to portions of the input time-series sequences that are directly related to characters appearing in questions and answers;
    a step of calculating third result values by concatenating the time-series sequences, the first result values, the second result values, and Boolean flags and selecting a final answer based on the third result values; and
    a step of outputting the final answer,
    wherein the preprocessing step further comprises:
    a step of generating time-series data by concatenating the pieces of data included in the data set in sequence;
    a step of generating a feature vector including a related character by extracting a word vector and an image feature vector from the time-series data and concatenating the extracted vectors with related character information of the time-series data as an one-hot vector; and
    a step of generating a time-series sequence having a contextual flow by inputting the feature vector including a related character to a bidirectional Long/Short Term Memory (bi-LSTM) model.

2. The question answering method of claim 1, wherein the data set comprises question-answer pairs, a script in which utterers are indicated, visual metadata (behaviors and emotions), and visual bounding boxes.

3. The question answering method of claim 1, wherein the step of calculating second result values comprises a step of calculating third result values using dot-product attention and multi-head attention.

4. A question answering apparatus comprising:
a storage unit configured to store a program that performs question answering; and
a control unit including at least one processor;
wherein when a data set including video content and question-answer pairs is received by executing the program based on a user input, the control unit:
generates input time-series sequences from the video content of the input data set, and also generates a question-answer time-series sequence from the question-answer pair of the input data set;
calculates weights by associating the input time-series sequence with the question-answer time-series sequence, and also calculates first result values by performing operations on the calculated weights and the input time-series sequences;
calculates second result values by paying attention to portions of the input time-series sequences that are directly related to characters appearing in questions and answers;
calculates third result values by concatenating the time-series sequences, the first result values, the second result values, and Boolean flags, and selects a final answer based on the third result values; and
outputs the final answer,
wherein when generating the input time-series sequences and the question-answer time-series sequence from the input data set, the control unit:
generates time-series data by concatenating the pieces of data included in the data set in sequence;
generates a feature vector including a related character by extracting a word vector and an image feature vector from the time-series data and concatenating the extracted vectors with related character information of the time-series data as an one-hot vector; and
generates a time-series sequence having a contextual flow by inputting the feature vector including a related character to a bidirectional Long/Short Term Memory (bi-LSTM) model.

5. The question answering apparatus of claim 4, wherein the data set comprises question-answer pairs, a script in which utterers are indicated, visual metadata (behaviors and emotions), and visual bounding boxes.

6. The question answering apparatus of claim 4, wherein when calculating second result values, the control unit calculates third result values using dot-product attention and multi-head attention.

7. A non-transitory computer-readable storage medium having stored thereon a program that performs the method set forth in claim 1.

8. A computer program that is executed by a question answering apparatus and stored in a non-transitory computer-readable medium to perform the method set forth in claim 1.

* * * * *